United States Patent [19]

Tapp

[11] Patent Number: 5,169,712
[45] Date of Patent: Dec. 8, 1992

[54] POROUS FILM COMPOSITES

[75] Inventor: William T. Tapp, Marietta, Ga.

[73] Assignee: Amoco Corporation, Chicago, Ill.

[21] Appl. No.: 749,215

[22] Filed: Aug. 23, 1991

[51] Int. Cl.$^5$ .................. B32B 3/26; B32B 5/22; B32B 27/00; D04H 1/58

[52] U.S. Cl. .................. 428/315.5; 428/903; 428/316.6; 428/317.9; 428/318.6; 428/319.9; 428/286

[58] Field of Search .............. 428/308.4, 318.4, 319.9, 428/315.5, 288, 316.6, 317.9, 318.6

[56] References Cited

U.S. PATENT DOCUMENTS

| | | | |
|---|---|---|---|
| 3,844,865 | 10/1974 | Elton et al. | 156/229 |
| 4,340,563 | 7/1982 | Appel et al. | 264/518 |
| 4,343,853 | 8/1982 | Morrison | 428/233 |
| 4,684,568 | 8/1987 | Lou | 428/265 |
| 4,766,029 | 8/1982 | Brock et al. | 428/286 |
| 4,790,736 | 12/1988 | Keuchel | 425/66 |
| 4,898,634 | 2/1990 | Keuchel | 156/167 |
| 4,975,469 | 12/1990 | Jacoby et al. | 521/84.1 |

FOREIGN PATENT DOCUMENTS 0288257 10/1988 European Pat. Off. .
0306818 3/1989 European Pat. Off. .

OTHER PUBLICATIONS

H. J. Leugering, "Effect of Crystal Structure and Overstructure on Some Properties of Polypropylene", Makromol. Chem. 109, pp. 204-216, (1967).

*Primary Examiner*—George F. Lesmes
*Assistant Examiner*—Chris Raimund
*Attorney, Agent, or Firm*—Robert G. Ladd; Robert J. Wagner; Frank J. Sroka

[57] ABSTRACT

A porous film composite comprising at least one layer of an oriented polymeric porous film comprising an ethylene-propylene block copolymer having an ethylene content of about 10 to about 50 wt %, a polypropylene homopolymer or random copolymer of propylene having up to about 10 wt % of a comonomer of ethylene or an α-olefin of 4 to 8 carbon atoms, and at least one component selected from a low molecular weight polypropylene, a beta-spherulite nucleating agent and calcium carbonate adhered to at least one layer of a polymeric foam product, a woven fabric, or a nonwoven fabric such as a carded web of staple fibers, a spunbond fabric, meltblown fabric and a self-bonded, fibrous, nonwoven web.

20 Claims, No Drawings

5,169,712

POROUS FILM COMPOSITES

FIELD OF INVENTION

This invention relates to porous film composites comprising at least one layer of an oriented polymeric microporous film prepared from a polymeric composition comprising an ethylene-propylene block copolymer having an ethylene content of about 10 to about 50 wt %, a polypropylene homopolymer or copolymer of propylene having up to about 10 wt % of a comonomer of ethylene or an α-olefin of 4 to 8 carbon atoms, and one or more components selected from low molecular weight polypropylene, a beta-spherulite nucleating agent and an inorganic filler, such as calcium carbonate, by a process including a beta-spherulite extraction step or a nonextractive process wherein the porous film layer is adhered to at least one layer of a material of a polymeric foam product, a woven fabric, or a nonwoven fabric such as a carded web of staple fibers, a spunbond fabric, a meltblown fabric and a self-bonded, fibrous, nonwoven web.

BACKGROUND OF THE INVENTION

Composites of porous films useful in a variety of applications such as construction fabric in the form of house wrap are known. Porous melt-processed polymeric films can be made by a number of processes. Among these are processes for stretching films of neat, unblended polymers containing no fillers other than typical stabilizer additives; processes for making films from blends of two or more polymers, or from blends of polymer with mineral oil or an organic salt in which the dispersed phase can be extracted with the film stretched before or after the extraction step; and processes for casting films from polymer blended with a filler such as calcium carbonate or barium sulfate with the film stretched after casting.

U.S. Pat. No. 4,766,029 discloses house wrap material consisting of a three-layer, semi-permeable nonwoven laminate having two exterior layers of spunbond polypropylene fabric and an interior two-component meltblown layer of polyethylene and polypropylene in which the laminate is calendered after formation so that the polyethylene melts and flows to close up the interstitial space and bond the layers together.

U.S. Pat. No. 4,684,568 discloses a process for preparing fabrics suitable for use as roofing-tile underlayment and building air-infiltration barriers that are permeable to moisture vapor and impermeable to liquid water consisting essentially of the steps of applying a continuous coating of polypropylene to a surface of a vapor and liquid permeable, fibrous sheet and then calendering the coated surface.

European Patent Application No. 0 306 818 discloses a process for producing a barrier fabric which is permeable to vapor and impermeable to liquid by laminating a vapor impermeable film to a reinforcing porous fibrous layer such as a spunbond polypropylene fabric to form a composite web and then needling the film of the composite web with tapered needles to form a plurality of micropores through the film.

European Patent Application No. 0 288 257 discloses a flexible membrane useful as lining for roofs or walls made of two spunbond polypropylene layers adhesively bonded together by a discontinuous, porous layer of polyolefin material which is impermeable to liquid water but permeable to air and water vapor.

U.S. patent application Ser. No. 601,519, entitled "Self-bonded Nonwoven Web and Porous Film Composites" filed Oct. 23, 1990, in the name of W. H. Stover, commonly assigned to the same assignee as this application, discloses composites of uniform basis weight self-bonded nonwoven webs and polymeric porous films.

Major limitations of prior art porous film composites comprising layers of microporous film and a second material include the ability to form a porous film composite which retains the vapor permeable and liquid impermeable properties of the porous film while at the same time not contributing greatly to the stiffness or bulk of the composite from the addition of the other material layer. For example, porous film composites wherein spunbond webs are used to impart strength, especially in the cross-machine direction, the spunbond web is typically nonuniform in basis weight and coverage such that relatively "thicker" and "thinner" areas are easily recognized by the human eye. Attempts have been made to compensate for these poor fabric aesthetics and limiting physical properties resulting from the nonuniformity of basis weight and coverage by using spunbond webs having a heavier basis weight than would normally be required by the particular application. This, of course, adds to the cost and contributes to greater stiffness, increased bulk and other undesirable features in the composite.

In view of the above limitations, there remains a need for improved porous film composites wherein the vapor permeable and liquid impermeable properties of the porous film layer are retained with enhanced strength properties provided by a second material layer and, in particular, those composites wherein an oriented polymeric microporous film is adhered to at least one layer of a woven or nonwoven fabric. It is an object of this invention to provide improved composite structures. Another object of this invention is to provide a porous film composite comprising at least one layer of an oriented polymeric microporous film adhered to at least one layer a carded web, a polymeric foam product, a woven fabric, a spunbond fabric, a meltblown fabric or a self-bonded nonwoven web.

The objects of this invention are attained with a porous film composite comprising at least one layer of a highly breathable oriented polymeric microporous film adhered to at least one layer comprising a material which provides enhanced strength and support to reinforce the film without substantially reducing the vapor permeable and liquid impermeable properties of the film layer. Examples of such reinforcing material include a polymeric foam product, a woven fabric, and a nonwoven fabric such as a carded web of staple fibers, a spunbond fabric, a meltblown fabric and a self-bonded nonwoven web. The oriented polymeric microporous film comprises a polymeric composition of an ethylene-propylene block copolymer with an ethylene content of about 10 to about 50 wt %, a polypropylene homopolymer or copolymer of propylene having up to 10 wt % of one or more other α-olefins of 2 to 8 carbon atoms, and at least one additional component which is a low molecular weight polypropylene, a beta-spherulite nucleating agent or calcium carbonate. For polymeric compositions comprising about 5 to about 30 wt % ethylene-propylene block copolymer, the oriented polymeric microporous film is formed by a process that includes the extraction of beta-spherulites and when the ethylene-propylene block copolymer concentration is about 30 to about 95 wt % the oriented polymeric microporous film is prepared by a process that includes stretching of a heated, nonextracted film.

These composites find particular use for vapor-permeable and liquid-impermeable product applications, for example, air-infiltration barriers, house wrap, roofing-tile underlayment, covers for equipment such as automobiles, motor bikes, stationary equipment and the like, and construction fabric for medical apparel, general protection, chemical protection and the like, and liners for clothing such as sporting apparel and the like. Among the advantages obtained from the porous film composites of this invention are improved hydrostatic waterproofness, improved moisture vapor transmission rate (MVTR) and strength per unit of basis weight, and improved barrier protection from water, solvents, hazardous chemicals and blood. Oriented porous films having a MVTR determined according to ASTM E-96, procedure E, of 500 g/m$^2$/24 hr or greater contribute to the improved vapor-permeable and liquid-impermeable properties of the composites of this invention.

SUMMARY OF THE INVENTION

Briefly, the porous film composite of this invention is provided by a composite comprising, at least one layer of an oriented polymeric microporous film having microvoid cells and interconnecting pores between the cells prepared by a process comprising the steps of:

(1) forming a film from a polymeric composition comprising, about 30 to about 90 parts by weight of a component A comprising an ethylene-propylene block copolymer having an ethylene content of about 10 to about 50 wt %, about 5 to about 40 parts by weight of a component B comprising a polypropylene homopolymer or random copolymer of propylene having up to about 10 wt % of a comonomer of ethylene or an α-olefin of 4 to 8 carbon atoms, about 1 to about 20 parts by weight of a component C comprising a low molecular weight polypropylene having a melt viscosity of about 50 to about 1,000 poise measured at a shear rate of 136 sec$^{-1}$ and 190° C., 0 to about 30 parts by weight, per 100 parts by weight of components A, B and C, of a component D comprising calcium carbonate, and 0 to about 50 ppm by weight, per 100 parts by weight of components A, B and C, of a component E comprising a beta-spherulite nucleating agent with the proviso that component C is present at (a) about 5 to about 20 parts by weight when the polymeric composition is substantially free of component D or of components D and E, and (b) about 1 to about 10 parts by weight when the polymeric composition has about 0.1 to about 10 ppm of component E and about 5 to about 30 parts by weight of component D, (2) heating said film at a temperature of about 35° C. to about 135° C., and (3) stretching said heated film in at least one direction at a stretch ratio of about 1.5 to about 10, or at least one layer of an oriented polymeric microporous film having polygonal cells with average dimensions of about 5 to about 30 microns and interconnecting pores between the cells having average diameters of about 0.2 to about 20 microns prepared by a process comprising the steps of:

forming a film from a polymeric composition comprising about 70 to about 95 parts by weight of a polypropylene homopolymer or random copolymer of propylene having up to about 10 wt % of a comonomer of ethylene or an α-olefin of 4 to 8 carbon atoms, about 5 to about 30 parts by weight of an ethylene-propylene block copolymer having an ethylene content of about 10 to about 50 wt % and a nucleating agent capable of producing beta-spherulites;

cooling the film below the crystallization temperature of the composition to form at least 20 wt % of beta-spherulites in the film;

extracting selectively the beta-spherulites in an amount corresponding up to 15 wt % of the composition from the cooled film with an extraction solvent selected from the group consisting of toluene, carbon tetrachloride and xylene to form a porous film; and orienting the porous film by heating the porous film at a temperature of about 110° to about 135° C. and stretching the heated porous film in at least one direction at a stretch ratio of about 1.5 to about 7.5, wherein the microporous film is adhered in laminar contact to at least one support layer capable of reinforcing the film without substantially reducing the vapor permeable and liquid impermeable properties of the film layer and the support layer is a polymeric foam product, a woven fabric, or a nonwoven fabric such as a carded web of staple fibers, a meltblown fabric, a spunbond fabric and a self-bonded, fibrous, nonwoven web.

DETAILED DESCRIPTION OF THE INVENTION

In greater detail, the porous film composite of this invention comprises at least one layer of an oriented polymeric microporous film having microvoid cells and interconnecting pores between the cells comprising about 5 to about 95 parts by weight of an ethylene-propylene block copolymer having an ethylene content of about 10 to about 50 wt %, about 95 to about 5 parts by weight of a polypropylene homopolymer or random copolymer of propylene having up to about 10 wt % of a comonomer of ethylene or an α-olefin of 4 to 8 carbon atoms, and one or more of the following components, per 100 parts by weight of ethylene-propylene block copolymer and polypropylene: 0 to about 20 parts by weight of a low molecular weight polypropylene having a melt viscosity of about 50 to about 1,000 poise measured at a shear rate of 136 sec$^{-1}$ and 190° C., 0 to about 30 parts by weight of a calcium carbonate having an average particle size of about 0.1 to about 10 microns, or 0 to about 50 ppm by weight of a beta-spherulite nucleating agent, wherein the film is adhered in laminar contact to at least one layer of a support material capable of providing strength and reinforcement to the film layer while at the same time having sufficient porosity so that the vapor permeable and liquid impermeable properties of the film layer are not significantly decreased. Examples of such support materials include a polymeric foam product, a woven fabric, and a nonwoven fabric such as a carded web of staple fibers, a meltblown fabric, a spunbond fabric and a self-bonded, fibrous, nonwoven web comprising a plurality of substantially randomly disposed, substantially, continuous thermoplastic filaments comprising a thermoplastic resin preferably selected from the group consisting of polypropylene, high-density polyethylene, low density polyethylene, linear low density polyethylene, a blend of polypropylene and polybutene and a blend of polypropylene and linear low density polyethylene.

The porous film composites of this invention comprise at least one layer of a microporous film prepared from polymeric compositions capable of being converted into oriented polymeric microporous film having microvoid cells and interconnecting pores between the cells by a process which include a beta-spherulite extraction step or a process which includes no extraction before orientation. The type of process depends upon the relative concentration of ethylene-propylene block copolymer to polypropylene homopolymer or random copolymer of propylene and on the presence and concentration of at least component of low molecular weight polypropylene, beta-spherulite nucleating agent or inorganic filler, such as calcium carbonate.

A second layer of support material capable of reinforcing the porous film layer without significantly decreasing the vapor permeable and liquid impermeable properties of the film is adhered to the film layer. By retaining the vapor permeable and liquid impermeable properties of the microporous film with the reinforcing properties of the second layer, the porous film composites of this invention have advantageous application in the protective apparel and construction fabric areas.

The porous films and polymeric compositions therefore used in the porous film composite can be the microporous film as disclosed in U.S. Patent Application titled "Oriented Polymeric Microporous Films", filed same day as this application, in the name of P. Jacoby et al., assigned to the present assignee. These films are polyolefin-based and have liquid impermeable and vapor permeable properties with an MVTR of 500 g/m$^2$/24 hr or greater. Two polymer components present in all of the polymeric compositions are the ethylene-propylene block copolymer and the polypropylene homopolymer or random copolymer of propylene containing up to 10 wt % of other comonomers.

The ethylene-propylene block copolymer is an ethylene-propylene block copolymer containing crystalline polypropylene and polyethylene segments and having an ethylene content of about 10 to about 50 wt %. The crystalline polypropylene segment has a melting point between 150° to 165° C. as measured by Differential Scanning Calorimetry (DSC), and preferably, for optimum porous film properties a melting point between 157° to 163° C. The heat of fusion, measured by DSC, is in the range of about 2 to 15 cal/g, preferably in the range of 5 to 10 cal/g. The crystalline polyethylene component has a DSC melting point of 100° to 135° C., preferably 115° to 125° C., and a DSC heat of fusion of about 0.2 to 10 cal/g, preferably 0.5 to 3 cal/g. The melt flow rate (MFR) according to ASTM D1238 of the ethylenepropylene block copolymer is typically about 0.5 to about 5.0 dg/min. Such block copolymers and methods for production thereof are known, as for example, a process for polymerizing propylene and ethylene in a multiplicity of steps in a polymerization system in the presence of a Ziegler-type sterospecific catalyst or a Ziegler-type stereospecific catalyst component of a carrier-supported transition metal compound and an organoaluminum compound. Ethylene-propylene block copolymers are also commercially available, for example, Hifax TM RA-061, a thermoplastic olefin of Himont Inc., which has a nominal MFR according to ASTM D1238 of 0.8 to 1.0 dg/min, a density of 0.88 g/cm$^3$ and typical melt processing temperatures of 193° to 227° C. Particularly preferred for producing highly breathable oriented microporous films as measured by MVTR, determined according to ASTM E-96, procedure E, is an ethylene-propylene block copolymer having an ethylene content of about 30 to about 45 wt %.

The polypropylene component is a polypropylene homopolymer or random copolymer of propylene having up to 10 wt % of another comonomer or mixtures of comonomers such as ethylene or an $\alpha$-olefin of 4 to 8 carbon atoms. These homopolymers or random copolymers of propylene have at least 40% crystallinity and typically at least 50% crystallinity as determined by x-ray diffraction analysis. The polypropylene component can have any degree of polymerization so long as the resulting polymeric composition is capable of being melt-extruded into a film, although it is preferable that the polypropylene component have a MFR of about 1.0 to about 30 dg/min measured at 230° C. under a load of 2.16 kg as specified by ASTM D1238. Polymeric compositions having polypropylenes with a MFR of less than 1.0 or greater than 30 dg/min generally are not as well suited for being converted into oriented polymeric microporous films having desirable strength and breathability properties. For ease of processing and production of porous films with desirable properties, a particularly preferred range of MFR is about 2.0 to about 5.0 dg/min.

The low molecular weight polypropylene component comprises a polypropylene homopolymer having a weight average molecular weight in the range of about 30,000 to about 100,000. Particularly preferred is low molecular weight polypropylene (LMWPP) having a melt viscosity of about 50 to about 1,000 poise when measured at a shear rate of 136 sec$^{-1}$ and a temperature of 190° C., and most preferred is a polypropylene having a melt viscosity of about 70 to about 550 poise measured at the same conditions. It is contemplated that the low molecular weight polypropylene component can also be provided by the polypropylene homopolymer or random copolymer of propylene component when such component has a sufficiently broad molecular weight distribution that the portion of low molecular weight polypropylene required in the polymeric composition is included in the amount of low molecular weight material in the polypropylene. Copolymers of propylene with other $\alpha$-olefins such as ethylene, butene and mixtures of these with propylene and other modified ethylene polymers such as impact modifiers, ethylene-propylene rubber, ethylene methyl acrylate, ethylene vinyl acetate, and the like, as well as polybutene can replace a part, usually less than 50%, of the low molecular weight polypropylene component. Suitable low molecular weight polypropylenes can be made by known technique and are commercially available, for example, from Polyvisions Inc., as Proflow-1000 and Proflow-3000.

In addition to the polymer components, nonpolymeric components such as beta-spherulite nucleating agents and inorganic fillers such as calcium carbonate can also be present. Commonly assigned U.S. Pat. No.

4,975,469 and the references cited therein, incorporated herein by reference, disclose beta-spherulite nucleating agents such as the gamma-crystalline form of a quinacridone colorant, the bisodium salt of orthophthalic acid, the aluminum salt of 6-quinizarin sulfonic acid and to a lesser degree isophthalic and terephthalic acids. The nucleating agents are typically used in the form of powdered solids. To efficiently produce beta-spherulites the powder particles of the nucleating agent should be less than 5 microns in diameter and preferably no greater than 1 micron in diameter. The preferred beta-spherulite nucleating agent that may be used in the polymeric compositions of this invention is the gamma-crystalline form of a quinacridone colorant. One form of the quinacridone colorant is red quinacridone dye, hereinafter also referred to as "Q-dye", having the structural formula

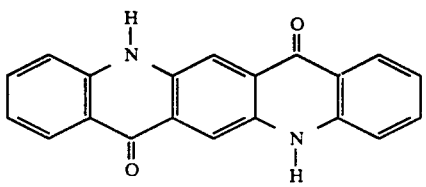

The inorganic fillers which can optionally be included in the polymeric compositions are solid inorganic metal salt particles which are non-hygroscopic, light-colored, water insoluble, highly pure, easily pulverized, finely divided, and have densities below 3.0 g/cc and melting points above typical polymer degradation temperatures. Calcium carbonate ($CaCO_3$) particles, which are preferred, can be in any suitable naturally occurring or man-made form. Naturally occurring forms include the rather pure crystals of calcite with a hexagonal geometric form and aragonite with an orthorhombic geometric form. The melting point of greater than 800° C. for calcium carbonate is in excess of any temperatures that might typically be used, even momentarily, to process thermoplastic polymers. The calcite form of calcium carbonate has a rating of 3 on the Moh's Scale of Hardness, barely above gypsum, and this degree of softness permits easy and rapid pulverizing. Suitable man-made, highly pure, commercially available forms of calcium carbonate include precipitated chalk and the like with very finely divided, pure particles in the range of 0.05 to 10 microns. Preferably, calcium carbonate with average particle size of about 0.1 to about 10 microns is used in the polymeric compositions to form highly breathable porous film. Calcium carbonate is aptly described as "water insoluble" in that it cannot be dissolved in deionized water to a sufficient extent to form a 0.1 wt % aqueous solution at 23° C. Even at temperatures up to 100° C., the maximum solubility of $CaCO_3$ in deionized water is about 0.002 wt %. Calcium carbonate is sensitive to acid, but is generally non-reactive with polymers such as polyolefins or with organic materials such as plasticizers; it is, for all practical purposes, substantially neutral in organic media.

Calcium carbonate is non-hygroscopic in the sense that it does not pick up moisture from the air, and particles of this salt do not have a tendency to "cake" or agglomerate due to absorbed moisture. Commercial grades of sodium chloride, for example, are generally too hygroscopic to be conveniently used as filler. The specific gravity of hexagonal calcium carbonate is only slightly above 2.7, and all forms of the salt have a specific gravity of less than 3.

Other inorganic salts with properties similar to calcium carbonate, e.g., the alkaline earth metal carbonates and sulfates of low solubility such as magnesium carbonate, calcium sulfate and barium sulfate can be substituted for calcium carbonate. Generally, however, these other salts lack one or more of the advantages of calcium carbonate. Barium sulfate is water insoluble, soft with a Moh's Hardness value of 2.5 to 3.5, very high melting, and generally white or light colored in finely divided form, but its specific gravity of almost 4.5 detracts from the prospect of making light weight films which contain high loadings of unbleached filler. Calcium sulfate is low in hardness, low in density, light in color, and very high melting, but is more water soluble than calcium carbonate. Being capable of acidic behavior, this salt is not neutral and may react with some organic polymers at elevated temperatures. Magnesium carbonate is more neutral and water insoluble, but is slightly harder, slightly denser, and subject to decomposition at relatively low temperatures, e.g., 350° to 400° C.

It is within the scope of the polymeric compositions to use inorganic fillers having a variety of colors, or to add color to them. Calcite, for example, occurs naturally in a wide variety of colors. The inorganic filler can act as a pore or channel forming agent as well as a pigmentation agent. By adding small amounts of calcium carbonate to the polymeric compositions, the breathability of the oriented film is enhanced by the action of polymer being pulled away from the calcium carbonate during orientation to create voids. The particles of $CaCO_3$, after stretching are located within the walls defining the pores or otherwise associated with the porous film structure, and can impart both color and opacity to the oriented polymeric microporous films.

In preparing the polymeric compositions, the composition components can be added to conventional blenders such as roll mills, drum tumblers, double-cone blenders, ribbon blenders, and the like, or any two or more of the components can be preblended or formed into a masterbatch and mixed with the remaining components in conventional blenders. The beta-spherulite nucleating agent generally in the form of powder can be dispersed in mixtures of polymeric components by any of the procedures normally used in the polymer art to ensure uniform mixing of powder and polymer resin. For example, the Q-dye in powder form can be blended with the polymer components in powder or pellet form or the Q-dye can be slurried in an inert medium and the slurry used to coat the polymer powder or pellets. Alternatively, mixing at elevated temperatures can be accomplished by using, for example, a roll mill or multiple passes through a melt-compounding extruder. A preferred mixing procedure is the blending of the nucleating agent in powder form with polymer pellets or powder followed by melt-compounding the resulting mixture in single-screw or multiple-screw extruder. Multiple passes may be necessary to ensure the desired level of dispersion of nucleating agent in the polymer. This procedure can also be used to form a masterbatch of nucleating agent and polymer. It is important that a homogeneous composition be formed so that films prepared from the polymeric composition have a uniform distribution of the polymer components and beta-spherulite nucleating agent in order that oriented polymeric microporous films with uniform strength and breathability are obtained.

For polymeric compositions which are capable of being converted into oriented polymeric microporous films by a process including the extractive removal of beta-spherulites to form a porous film with a subsequent orientation step, the polymeric composition comprises about 5 to about 30 parts by weight of the ethylene-propylene block copolymer, about 70 to about 95 parts by weight of the polypropylene homopolymer or random copolymer of propylene and about 0.1 to about 10 ppm of the beta-spherulite nucleating agent. Porous films prepared by this process from compositions containing less than 5 parts by weight of the ethylene-propylene block copolymer do not exhibit the improved aesthetic qualities such as softer hand and decreased noise generation when flexed, whereas films prepared from compositions containing more than 30 parts by weight of the ethylene-propylene block copolymer do not exhibit sufficient porosity. Oriented porous films prepared from compositions comprising about 5 to about 30 parts by weight of the ethylenepropylene block copolymer by a process including the formation of a porous film by the extractive removal of beta-spherulites have improved aesthetic qualities such as a softer hand and decreased noise generation when flexed and good breathability properties as measured by MVTR.

The amount of beta-spherulite nucleant useful in forming porous films by the extractive removal of beta-spherulite technique from the polymeric compositions of this invention depends on the effectiveness of the particular nucleant for inducing beta-crystals and the amount of porosity desired in the porous film. For Q-dye, the amount present in the polymeric compositions can range from about 0.01 to about 50 ppm by weight. Sufficient nucleating agent is employed to induce the formation of 20 wt % or more of beta-spherulites in the film. Preferably, about 0.1 to about 10 ppm by weight of Q-dye is utilized. Other things being equal, less than about 0.01 ppm of Q-dye has a negligible effect on the level of beta-form spherulites present in the film, and amounts greater than 50 ppm do not significantly increase the amount of beta-spherulites formed. For compositions with about 0.1 to about 10 ppm of Q-dye acting as a nucleating agent and formed into a film, a sufficient amount of beta-spherulites is formed in the film such that a high porosity film is formed when the film is extracted with toluene, carbon tetrachloride or xylene. With a subsequent orientation step, a film having increased porosity and breathability is formed.

For compositions including a beta-spherulite nucleating agent, a critical parameter in the formation of beta-spherulites in the film is the rate at which the film is cooled. Other parameters being equivalent, the more rapid the cooling, the smaller the size of the beta-spherulites formed. If the molten film is cooled too rapidly, it is possible that essentially no beta-spherulites are formed. Conversely, the slower the film is cooled, the larger the size of the beta-spherulites formed. Little or no beta-spherulites are formed below about 80° C. or above about 130° C. The cooling conditions needed to achieve the desired beta-spherulite size can be controlled by one or more of the following parameters: polymer melt temperature, extrusion rate, drawdown ratio, die gap and chill roll temperature for extruded film, and cooling air velocity and temperature for blown film. Other things being equal, an increase in one of the following parameters results in a decrease in the rate at which the molten film is cooled or quenched and, consequently, an increase in the size of the beta-spherulites formed: polymer melt temperature, extrusion rate, die gap, cooling air temperature, and chill roll temperature. Conversely, other things being equal, a decrease in one of these variables results in a decrease in the size of the beta-spherulites. By contrast, other things being equal, an increase in either the drawdown ratio or cooling air velocity results in an increase in the quench rate and an associated decrease in the size of the beta-spherulites formed.

For polymeric compositions capable of being formed into microporous films by a process including the extraction of beta-spherulites from formed films, the film is ordinarily at least about 0.005 millimeters in thickness. The useful maximum thickness depends on the time of extraction of the beta-spherulites. Other things being equal, the thicker the film, the longer the time required to extract a given percentage of the total beta-spherulites present. The beta-spherulites formed in the film can be extracted with nonpolar, organic solvents. For ease of operation, it is preferred that the extracting medium have a boiling point greater than about 100° C. It is possible to utilize mixtures of two or more organic solvents and in such an event the lower boiling solvent should have a boiling point greater than about 100° C. Preferred extraction solvents include toluene, carbon tetrachloride, and xylene, with toluene being most preferred. Any conventional extractive technique used in the extraction of films can be used. Particularly useful are processes which include temperature- and environment-controlled extraction vessels which permit complete immersion of the films in the extraction solvent at a controlled temperature and under conditions in which any extraction solvent vapors are contained.

The extraction conditions are critical in selectively removing at least a portion of the beta-spherulites while minimizing the amount of alpha-form crystalline polypropylene removed. Removal of the beta-form crystals is very temperature dependent. If the extraction temperature is too low, the beta-spherulites are removed too slowly or not at all; and, if the extraction temperature is too high, alpha-form crystals are dissolved along with the beta-form. The optimum temperature of extraction depends on the particular extraction medium used and can be readily determined by one skilled in the art. For the preferred extracting medium, toluene, the extraction is preferably accomplished in the temperature range of about 85° to about 95° C., most preferably about 88° to about 93° C. It has also been found that for films containing cornstarch extraction temperatures which are about 3° to 5° C. lower can be used.

The extraction time, used herein to mean the time the film contacts the extracting medium at the extraction temperature, relates to the extraction temperature. Other things being equal, the higher the extraction temperature, the shorter the extraction time; conversely, the lower the extraction temperature the longer the film must be in contact with the extraction medium to remove a given amount of beta-spherulites. The length of the extraction time can be used to control the degree of porosity to some extent since at a given extraction temperature greater quantities of the beta-spherulites can remain in the film as the extraction time is decreased. It is preferred that up to 15 wt % of the beta-spherulites be extracted as measured by weight loss in the extracted film. The extraction time also depends on the thickness of the film being extracted. At a given temperature, the extraction time increases as the film becomes thicker. Ordinarily the extraction time ranges from about 1.5 to about 20 minutes. Preferably, the extraction time is 10 minutes or less.

The extracted film can be dryed at a drying station to remove any extraction solvent which remains with the film. The drying station can be any conventional means used to remove materials such as extraction solvents. Devices such as radiant heaters can be employed with the preferred drying method utilizing a blower for impinging heated air on the film. With both the drying station and the extraction vessel, environmental procedures involved in handling extraction solvents and their vapors are utilized. It is preferred that extraction vessels and the drying stations be contained in a housing equipped with exhaust and volatiles treatment facilities to minimize loss of the extraction solvent to the environment.

In the orienting step, the extracted, porous film can be stretched uniaxially or biaxially at stretch ratios of about 1.5 to about 7.5. Uniaxial stretching methods include rolls, and a roll or tenter for restraining the film. Biaxial stretching methods include successive uniaxial stretching comprising longitudinal stretching by rolls and transverse stretching by a tenter and simultaneous biaxial stretching using a tenter. For biaxial stretching, the stretch ratio in the longitudinal or machine direction and transverse direction may be the same or different. Preferably the thickness of oriented films produced from the polymeric compositions of this invention ranges from about 0.005 millimeters to about 0.2 millimeters in thickness. The unstretched porous films from which the oriented films are formed range in thickness from about 0.01 to about 0.4 millimeters.

In a particular embodiment the porous film composite of this invention comprises at least one layer of an oriented polymeric porous film having polygonal cells with average greatest dimensions of about 5 to about 30 microns and interconnecting pores between the cells having average diameters of about 0.2 to about 20 microns is formed by the process comprising the steps of:

(a) forming a film comprising a blend of polypropylene, about 5 to about 30 wt % of an ethylene-propylene block copolymer having an ethylene content of about 10 to about 50 wt % and a nucleating agent capable of producing beta-spherulites;

(b) cooling said film below the crystallization temperature of said blend to form at least 20 wt % of beta-spherulites in the film;

(c) extracting selectivity said beta-spherulites in an amount corresponding up to at least 15 wt % of the blend from the cooled film with an extraction solvent to form a porous film; and (d) orienting the porous film by heating the porous film at a temperature of about 110° to about 135° C. and stretching the heated porous film in at least one direction at a stretch ratio of about 1.5 to about 7.5 adhered to at least one layer of a material selected from the group consisting of a polymeric foam product, a woven fabric, a carded web, a spunbond fabric, a meltblown fabric and a self-bonded nonwoven web.

For the facile process for preparing oriented polymeric microporous films which does not require a betaspherulite extraction step, the polymeric composition comprises about 30 to about 95 parts by weight of the ethylenepropylene block copolymer having an ethylene content of about 10 to about 50 wt %, about 5 to about 40 parts by weight of polypropylene homopolymer or random copolymer of propylene having up to 10 wt % of a comonomer of ethylene or an α-olefin of 4 to 8 carbon atoms, and low molecular weight polypropylene homopolymer having a melt viscosity of about 50 to about 1,000 poise measured at a shear rate of 136 sec$^{-1}$ and 190° C. such that the low molecular weight polypropylene is present in the polymeric composition in an amount.

(a) about 1 to about 10 parts by weight when the polymeric composition additionally comprises a betaspherulite nucleating agent and about 5 to about 30 parts by weight of a calcium carbonate, and (b) from about 5 to about 20 parts by weight when the polymeric composition additionally comprises a betaspherulite nucleating agent but is substantially free of calcium carbonate or when said polymeric composition is substantially free of calcium carbonate and betaspherulite nucleating agent.

The beta-spherulite nucleating agent can be present as the red quinacridone dye, Q-dye, at about 0.1 to about 50 ppm by weight and calcium carbonate can be present at about 5 to about 30 parts by weight, based on 100 parts by weight of the ethylene-propylene block copolymer and polypropylene homopolymer or random copolymer of propylene. Particularly preferred polymeric compositions for forming oriented microporous films with a MVTR of 500 g/m$^2$/24 hr or greater comprise about 45 to about 75 parts by weight of the ethylene-propylene block copolymer and about 20 to about 35 parts by weight of the polypropylene homopolymer. Films formed by the nonextraction technique from polymeric compositions having less than 30 or more than 95 parts by weight of ethylene-propylene block copolymer do not exhibit sufficient porosity and breathability.

In general, the low molecular weight polypropylene component is present in polymeric compositions used to make microporous film by the nonextractive technique and is absent in film prepared by the process using the beta-spherulite extraction technique. For polymeric compositions comprising ethylene-propylene block copolymer, polypropylene, low molecular weight polypropylene with or without beta-spherulite nucleating agent, the low molecular weight polypropylene is preferably present in the composition at about 5 to about 20 parts by weight. For polymeric compositions comprising, in addition to the three polymeric components, the beta-spherulite nucleating agent and an inorganic filler such as calcium carbonate, the low molecular weight polypropylene is preferably present in the composition at about 1 to about 10 parts by weight. For polymeric compositions in which the low molecular weight compositions are outside the preferred ranges, the resulting oriented oriented porous films are generally less facile to form and have lower breathability and strength properties.

Incorporation of a low molecular weight polyolefin such as polypropylene homopolymer having a melt viscosity of about 50 to about 1,000 poise measured at 136 sec$^{-1}$ and 190° C. into compositions of ethylenepropylene block copolymer and polypropylene homopolymer or copolymer of propylene significantly increases the breathability of microporous films made from these compositions by stretching and without an extraction step. Film made from compositions containing greater than 20 parts by weight of the low molecular weight polyolefin have a greater tendency to tear during stretching. For one preferred composition capable of being formed into microporous film additionally comprising a beta-spherulite nucleating agent, the low molecular weight polypropylene can range from 5 to about 20 parts by weight. Upon stretching, films formed from compositions having beta-spherulites exhibit increased breathability due the enhanced formation of interconnecting pores between the microporous cells. For another preferred embodiment in which the polymeric compositions comprise about 5 to about 30 parts by weight of $CaCO_3$ as well as a beta-spherulite nucleating agent, it has been found that the amount of the low molecular weight polypropylene can range from about 1 to about 10 parts by weight. The addition of the low level of $CaCO_3$ contributes to the formation of interconnecting pores between the microvoid cells upon stretching the film.

The process film composite of this invention comprises at least one layer of an oriented microporous polymeric film having microvoid cells and interconnecting pores between the cells prepared by a process comprising the steps:

(1) forming a film from a polymeric composition comprising, about 30 to about 90 parts by weight of a component A comprising an ethylene-propylene block copolymer having an ethylene content of about 10 to about 50 wt %, about 5 to about 40 parts by weight of a component B comprising a polypropylene homopolymer or random copolymer of propylene having up to about 10 wt % of a comonomer of ethylene or an α-olefin of 4 to 8 carbon atoms, about 1 to about 20 parts by weight of a component C comprising a low molecular weight polypropylene having a melt viscosity of about 50 to about 1,000 poise measured at a shear rate of 136 $sec^{-1}$ and 190° C., 0 to about 30 parts by weight, per 100 parts by weight of components A, B and C, of a component D comprising calcium carbonate, and 0 to about 50 ppm, per 100 parts by weight of components A, B and C, of a component E comprising a beta-spherulite nucleating agent with the proviso that component C is present at (a) about 5 to about 20 parts by weight when the polymeric composition is substantially free of component D or of components D and E, and (b) about 1 to about 10 parts by weight when the polymeric composition has about 0.1 to about 10 ppm of component E and about 5 to about 30 parts by weight of component D, (2) heating said film at a temperature of about 35° to about 135° C., and (3) stretching said heated film in at least one direction at a stretch ratio of about 1.5 to about 10, wherein the oriented microporous film layer is adhered to at least one layer of a material selected from the group consisting of a polymeric foam product, a woven fabric, a carded web, a spunbond fabric, a meltblown fabric and a self-bonded nonwoven web.

In step (1) of the process a film is formed from the polymeric composition by any suitable process known in the art for forming films from polymeric compositions and, in particular, polyolefin-based compositions. Among these are processes including melt-forming processes such as slot-die extrusion and blown-bubble extrusion, with the slot-die extrusion process preferred for ease of operation. In either the blown-bubble or the slot-die extrusion process the polymer composition is formed into a melt by a melt-forming means such as a single-screw or a twin-screw extruder. The polymeric composition together with optional additives or modifiers can be supplied in pellet or powder form to the extruder or the various composition components can be supplied directly to the melt-forming means for a combination of compounding and melting. Typically, temperatures in the extruders range from about 200° to about 280° C. and, in particular, for polyolefin-based compositions from about 220° to about 250° C. The residence time of the polymeric compositions in the extruders can vary with the size of the equipment and desired throughput but should be sufficiently long to achieve mixing and melting while at the same time avoiding degradation of polymer. In the blown-bubble extrusion process, the film is preferably cooled with a stream of air. In the slot-die extrusion process, the cooling can be accomplished with liquid in a cooling bath, such as water, a chill roll or a stream of air with chill rolls typically used. For film formed from polyolefin-based compositions with one or more chill rolls, the rolls typically have temperatures of about 80° to about 120° C.

Small amounts, usually less than about 5 parts by weight based on the total weight of the polymeric components of the composition, of other materials used in processing polymeric compositions such as lubricants, plasticizers, processing plasticizers, surfactants, water, and the like, may optionally be present. Yet other materials introduced for particular purposes may optionally be present in the polymeric compositions in small amounts, usually less than about 15 parts by weight based on the total weight of the composition. Examples of such materials include antioxidants, antimicrobial agents, ultraviolet light absorbers, flame retardants, dyes, pigments, and the like. The addition of these materials can be made as the compositions are being prepared or when the compositions are being formed into microporous film, and the addition can be made by any suitable means such as metering pumps, extruders, and the like.

A particularly useful additive in the polymeric compositions is an antimicrobial agent. As used herein antimicrobial agents include both fungicidal and antibacterial agents and are materials for deodorizing or inhibiting bacterial, fungal or microbial growth in synthetic textile articles such as surgical gowns and masks, and institutional textile products. Inhibiting fungal growth serves to protect the fabric itself, while the inhibition of bacterial growth prevents odor caused by the bacterial breakdown of organic matter. Antimicrobial agents, disclosed in U.S. Pat. No. 4,343,853 which can be added to the polymeric compositions include nitrophenylacetate, phenylhydrazine, polybrominated salicylanilides such as 5,4'-dibromosalicylanilide and 3,5,4'-tribromosalicylanilide, chlorhexidine, domiphen bromide, cetylpyridinium chloride, benzethonium chloride, 2,2'-thiobis(4,6-dichloro)phenol, 2,2'-methylenebis-(3,4,6-trichloro)phenol and 2,4,4'-trichloro-2'-hydroxydiphenyl ether.

A particularly preferred antimicrobial agent comprises 2,4,4'-trichloro-2'-hydroxydiphenyl ether which provides suitable antimicrobial effect when present in polymeric compositions at concentrations of about 100 to about 2,000 ppm, by weight of the polymeric components of the composition. At concentration levels below 100 ppm in the polymeric composition, the antimicrobial effect generally is insufficient after the composition has been processed into a microporous film. Preferably, about 200 to about 750 ppm of 2,4,4'-trichloro-2'-hydroxydiphenyl ether, by weight of the polymeric components of the microporous film, is present to ensure retention of the microbial effect after processing. A specific example of such an antimicrobial agent is that designated as Microban ® Plastic Additive B from Clinitex Corporation of Huntersville, N.C.

The antimicrobial agent can be incorporated into the microporous film prepared from the polymeric compositions by combining the agent with the composition prior to or during extrusion of the film so that the agent is substantially uniformly dispersed in the composition in the molten state. Preferably, a concentrate or masterbatch of about 5 to about 15 wt % antimicrobial agent in the propylene homopolymer component of the polymeric composition is employed to simplify handling of the agent and to improve dispersion of the agent in the polymeric composition and microporous film prepared therefrom.

The film provided in step (1) can be obtained directly from the film forming operation or it can be wound on a take-up roll and provided to step (2) from these take-up rolls. Steps (2) and (3) include heating and stretching steps, respectively, by which the provided film is rendered microporous. The film is heated by any suitable heating means for a time and at a temperature such that the film attains the desired temperature in as short a time as possible while retaining properties of the film. Typically, heating rolls are used to heat the film to the desired orientation temperature. For films stretched simultaneously in both directions the desired temperature ranges from about 40° to about 95° C. For films formed from polypropylene-based compositions, the films are preferably heated from about 70° to about 85° C. The desired temperature ranges for films which are stretched in the machine direction and subsequently stretched in the transverse direction are different for the two operations. The desired temperature for orientation in the machine direction can range from about 40° to about 95° C., with a preferred temperature range of about 60° to about 70° C. for films formed from polyolefin-based compositions. In the subsequent transverse direction orientation, the desired temperature can range from about 75° to about 140° C., with a preferred temperature range of about 105° to about 120° C. for polyolefin-based compositions. Attempts to orient films at temperatures outside the preferred temperature ranges typically do not produce films with the desired porosity and strength properties.

In addition to the type of orientation, the composition of the film also influences the orientation temperature. For films comprising ethylenepropylene block copolymer, polypropylene homopolymer or random copolymer of propylene and low molecular weight polyolefin the films are preferably heated to a temperature of about 50° to about 80° C. For films comprising ethylene-propylene block copolymer, propylene homopolymer or random copolymer, low molecular weight polyolefin, a beta-spherulite nucleating agent and/or an inorganic filler such as calcium carbonate the films are preferably heated to a temperature in the range of about 35° to about 135° C.

In step (3) the heated film can be stretched uniaxially or biaxially. Uniaxial stretching can be performed using rolls with a roll or tenter for restraining the film. Biaxial stretching can include successive uniaxial stretching steps comprising longitudinal stretching by rolls and transverse stretching by a tenter, simultaneous biaxial stretching using a tenter and the like. For biaxial stretching, the stretch ratio in the longitudinal or machine direction and transverse direction may be the same or different. Generally, the stretch ratios are approximately the same in both directions. The stretch ratio for either uniaxial or biaxial orientation can be about 1.5 to about 10. The preferred method of biaxial stretching includes the formation of a film by extruding a film with a small amount of MD orientation usually less than 25% of the total MD orientation. The formed film is further oriented in the MD followed by orientation in the TD such that the ration of the final MD to TD orientation draw ratio is about 0.8 to 1.2. The preferred stretch ratio for biaxial stretching is about 1.5 to about 5 and for uniaxial stretching about 1.5 to about 6.

The oriented polymeric microporous films formed from the polymeric compositions of this invention can be made within a wide range of film thickness or caliper. For the uses contemplated for these films, a thickness of more than 0.005 mm and less than about 2 mm is generally preferred. Films having a thickness in the range of about 0.01 to about 1 mm are particularly useful. The basis weight of the microporous film useful as at least one layer of the porous film composites of this invention is preferably about 10 to about 70 g/m$^2$. A measurable decrease in caliper or thickness normally occurs after the stretching step. For uniaxial orientation, this decrease can be as much as one-third of the thickness of the unoriented film. For biaxial and uniaxial orientations with very high stretch ratios, the decrease in thickness can be even greater. Preferably, the thickness of oriented films produced by this invention ranges from about 0.005 to about 1.0 mm in thickness. The unstretched films from which the oriented films are formed range from about 0.01 to about 2.0 mm in thickness.

A support layer is adhered to the microporous film layer to provide additional support and reinforcement. The support layer material should provide support while at the same time not significantly decreasing the vapor permeable properties of the microporous film as measured by MVTR determined according to ASTM E-96, procedure E. Typically, the MVTR of the resulting composite is reduced less than 15% compared to the MVTR of the porous film layer of the composite. Examples of materials useful as support layers include polymeric foam products, woven fabrics and nonwoven fabrics such as carded webs, spunbond fabrics, meltblown fabrics and self-bonded, fibrous, nonwoven webs. These materials are discussed in more detail below.

The carded nonwoven webs used as a second layer in the porous film composites of this invention comprise staple fibers having a length between about 1.9 and 15 cm made from thermoplastics such as polypropylene, a blend of polypropylene and polybutene and a blend of polypropylene and linear low density polyethylene. The denier of these fibers is in the range of about 1 to about 8 and the crimps per inch for polyolefins is about 4 to about 30. The staple fibers are supplied to a carding line in the form of bales or bundles which are opened mechanically by pickers equipped with sharp teeth or needles to tear the tightly compacted fibers apart by a process called picking. The fibers are transferred mechanically on belts or by chutes to form fiber batts, called picker laps, which are processed by carding.

The carding process can be a revolving flat, stationary flat or worker-stripper process. For example, in the revolving flat carding process, a carding machine utilizes opposed moving beds of closely spaced needles to pull and tease the fibers apart. At the center of the carding machine is a large, rotating cylinder covered with a card clothing comprised of needles, wires, or fine metallic teeth embedded in a heavy cloth or metal foundation. Opposing moving beds of needles are wrapped on the large cylinder and a large number of narrow flats are held on an endless belt moving over the top of the cylinder. The needles of the two opposing surfaces are inclined in opposite directions and move at different speeds with the main cylinder moving faster than the flats.

The clumps of fibers between the two beds of needles are separated into individual fibers which are aligned in the machine direction as each fiber is theoretically held by individual needles from the two beds. The fibers engage each other randomly and form a coherent web at and below the surfaces of the needles. The carding machine may also include means to carry the picker lap or batt onto the cylinder where the carding takes place. Other mechanical means remove or doff the web from the cylinder. The doffed web is deposited onto a moving belt where it can be combined with other webs. Carded webs can be up to 3.5 m wide or wider and can be produced at speeds up to 140 m/min or faster. Nonwoven webs made from webs from conventional cards have high machine direction and low cross-machine direction tensile strengths. Cross-machine tensile strength can be improved by cross-laying an oriented web at or near a 45° angle to another oriented web on the moving belt. However, this procedure is generally not successful with low basis weight carded webs because of the difficulty of accurately laying down the layers without unsightly edge lines. The basis weight of the carded web useful as at least one layer of the porous film composites of this invention is preferably about 10 to about 30 g/m$^2$.

The spunbond fabric used as a second layer in the porous film composites of this invention can be produced by extruding a multiplicity of continuous thermoplastic polymer strands through a die in a downward direction onto a moving surface where the extruded strands are collected in a randomly distributed fashion and subsequently bonded together by thermobonding or by needlepunching to provide sufficient integrity in a resulting nonwoven web of continuous fibers. One method of producing spunbond nonwoven webs is disclosed in U.S. Pat. No. 4,340,563. Spunbond webs are characterized by a relatively high strength/weight ratio, isotropic strength, high porosity and abrasion resistance properties and by nonuniformity of properties such as basis weight and coverage. Suitable thermoplastic resins for making spunbond fabrics useful as a second layer in the porous film composites of this invention include polyolefins of branched and straight-chained olefins such as low density polyethylene, linear low density polyethylene, high density polyethylene, polypropylene, polybutene, combinations thereof and the like. The basis weight of the spunbond fabric useful as at least one layer of the porous film composites of this invention is preferably about 5 to about 70 g/m$^2$.

The meltblown fabric used as a second layer in the porous film composites of this invention can have a basis weight in the range of 10 to about 70 g/m$^2$ and can be a meltblown microfibrous nonwoven web comprising a plurality of substantially totally discontinuous thermoplastic filaments of small diameter fibers having an average filament diameter not greater than about 10 microns, preferably in the range of about 1 to about 5 microns. Meltblown nonwoven webs can be made by heating a thermoplastic resin to form a polymer melt, extruding the polymer melt through a plurality of fine, typically circular, die capillaries into a high velocity air stream which attenuates the filaments of molten thermoplastic resin to reduce their diameter. Thereafter, the microfilaments are transported by the high velocity air stream and deposited on a collecting surface to form a web of randomly disposed, discontinuous meltblown microfibers. Suitable thermoplastic resins for making meltblown fabrics useful as a second layer in the porous film composites of this invention include polyolefins of branched and straight-chained olefins such as low density polyethylene, linear low density polyethylene, high density polyethylene, polypropylene, polybutene, combinations thereof and the like.

Woven fabrics useful as a second layer in the porous film composites of this invention can be produced by conventional weaving looms from yarns such as spun yarns, tape yarns, textured yarns such as bulk continuous filaments and the like and fibrillated yarns for enhanced flexibility, compressibility and strength. The fabrics can be produced with a variety of weaves such as plain weave, rib weave, basket weave, twill weave and satin weave, patterns, color combinations, basis weights, fibers such as natural fibers and thermoplastic fibers and the like. Suitable thermoplastic resins for the thermoplastic fibers include polyolefins of branched and straight-chained olefins such as low density polyethylene, linear low density polyethylene, high density polyethylene, polypropylene, polybutene, combinations thereof and the like.

The polymeric foam product which can be used as a second layer in the porous film composites of this invention can be produced by conventional foaming processes from suitable thermoplastic resins including polyolefins of branched and straight-chained olefins such as low density polyethylene, linear low density polyethylene, high density polyethylene, polypropylene, polybutene, combinations thereof and the like. The polymeric foam product should be of the open-cell type of foam so as to not impede the vapor permeable nature of the porous film layer of the porous film composite.

Particularly preferred as a second layer of the porous film composites of this invention is a self-bonded, fibrous, nonwoven web of substantially randomly disposed, substantially continuous polymeric filaments. The selfbonded, fibrous, nonwoven webs comprise substantially continuous thermoplastic filaments and can be produced by the process disclosed in U.S. patent application No. 556,353, filed Jul. 20, 1990, in the name of Geraldine M. Easton, et al., commonly assigned to the present assignee.

Also, U.S. Pat. Nos. 4,790,736 and 4,898,634 disclose an apparatus and method useful in making the selfbonded nonwoven webs.

By "nonwoven web", it is meant a web of material which has been formed without the use of weaving processes and which has a construction of individual fibers, filaments or threads which are substantially randomly disposed.

By "uniform basis weight nonwoven web", it is meant a nonwoven web comprising a plurality of substantially randomly disposed, substantially continuous polymeric filaments having a BWUI of 1.0±0.05 determined from average basis weights having standard deviations of less than 10%. Preferably the filament deniers are in the range of about 0.5 to about 20. BWUI is defined as the ratio of an average unit area basis weight determined on a unit area sample of web to the average basis weight determined on an area of web, N times as large as the unit area, wherein N is about 12 to about 18, the unit area is 6.45 cm$^2$ (1 in$^2$) and wherein standard deviations of the average unit area basis weight and the average basis weight of the area N times as large as the unit area are less than 10% and the number of samples is sufficient to obtain basis weights at a 0.95 confidence interval. As used herein for the determination of BWUI, both the average unit area basis weight and the larger average area basis weight must have standard deviations of less than 10% where "average" and "standard deviation" have the definitions generally ascribed to them by the science of statistics. Materials having BWUIs of 1.0±0.05 which are determined from averages basis weights having standard deviations greater than 10% for one or both of the averages do not represent a uniform basis weight nonwoven web as defined herein and are poorly suited for use in making the invented composites because the nonuniformity of basis weights may require heavier basis weight materials to be used to obtain the desired coverage and fabric aesthetics. Unit area samples below about 6.45 cm$^2$ in area for webs which have particularly nonuniform basis weight and coverage represent unit areas which are generally too small to give a meaningful interpretation of the unit area basis weight of the web. The samples on which the basis weights are determined can be any convenient shape, such as a square, a circle, a diamond and the like, with the samples randomly cut from the fabric by punch dies, scissors and the like to assure uniformity of the sample area size. The larger area is about 12 to about 18 times the area of the unit area with the larger area required to obtain an average basis weight for the web which will tend to "average out" the thick and thin areas of the web. The BWUI is then calculated by determining the ratio of the average unit area basis weight to the average larger area basis weight. A BWUI of 1.0 indicates a web with a very uniform basis weight. Materials having BWUI values of less than 0.95 or more than 1.05 or wherein the standard deviation of one or both of the average basis weights used to determine the BWUI is greater than 10% are not considered to have uniform basis weights as defined herein. Preferably for self-bonded, fibrous, nonwoven with a high uniformity of basis weight, the BWUI has a value of 1.0±0.03.

By "self-bonded", it is meant that crystalline and oriented thermoplastic filaments or fibers in the nonwoven web adhere to each other at their contact points, thereby forming a self-bonded, fibrous, nonwoven web. Adhesion of the fibers may be due to fusion of the hot fibers as they contact each other, to entanglement of the fibers with each other or to a combination of fusion and entanglement. Of course, bonding does not occur at all contact points. Generally, however, the bonding of the fibers is such that the nonwoven web, after being laid down but before further treatment, has sufficient machine direction (MD) and cross-machine direction (CD) or transverse direction (TD) tensile strength to allow handling of the web without additional treatment. No foreign material need be present to promote bonding, and essentially no polymer flows to the intersection points as distinguished from that which occurs during the process of heat-bonding thermoplastic filaments. The bonds are weaker than the filaments as evidenced by the observation that an exertion of a force tending to disrupt the web, as in tufting, will fracture bonds before breaking filaments. Of course, the self-bonded web can also be prebonded, e.g., by a calendering operation or with adhesive, if desired, but prebonding is not necessary due to the integrity of the self-bonded web as produced.

By "substantially continuous", in reference to polymeric filaments of the self-bonded webs, it is meant that a majority of the filaments or fibers are formed as substantially continuous nonbroken fibers as they are drawn and formed into the self-bonded web.

In a preferred embodiment, the self-bonded, fibrous, nonwoven webs are prepared by extruding a molten polymer through multiple orifices located in a rotating die, contacting the extruded polymer while hot as it exits the orifices with a fluid stream to form substantially continuous filaments, drawing the filaments into fibers having deniers in the range of about 0.5 to about 20, and collecting the drawn fibers on a collection device whereby the filaments extruded through the die strike the collection device and self-bond to each other to form the nonwoven web. These self-bonded, fibrous, nonwoven webs can be supplied directly from the process or the webs can be supplied from rolls onto which the webs have been wound.

Thermoplastic melt is extruded by means such as an extruder or a melt pump through a plurality of orifices such as spinnerettes located about the circumference of a rotating die having a spinning speed of about 150 to about 2,000 m/min. There can be multiple spinning orifices per spinnerette and the diameter of an individual spinning orifice can be between about 0.1 to about 2.5 mm, preferably about 0.2 to about 1.0 mm. The length-to-diameter ratio of the spinnerette orifice is about 1:1 to about 10:1. The particular geometrical configuration of the spinnerette orifice can be circular, elliptical, trilobal or any other suitable configuration. Preferably, the configuration of the spinnerette orifice is circular or trilobal. The rate of polymer extruded through the spinnerette orifices can be about 0.0225 kg/hr/orifice or greater. Preferably, for uniform production the extruded polymer rate is about 0.1 kg/hr/orifice or greater.

As the fibers extrude horizontally through spinnerette orifices in the circumference of the rotating die, the fibers assume a helical orbit as they begin to fall below the rotating die. The fluid stream which contacts the fibers can be directed downward onto the fibers, directed to surround the fibers or directed essentially parallel to the extruded fibers. The fluid stream is typically ambient air which can also be conditioned by heating, cooling, humidifying or dehumidifying and the like. A pressure air blower fan can be used to generate a quench air stream. Polymer fibers extruded through the spinnerette orifices of the rotary die are contacted by the quench air stream.

The quench air stream can be directed radially above the fibers which are drawn toward the high velocity air stream as a result of a partial vacuum created in the vicinity of the fibers by the air stream. The polymer fibers then enter the high velocity air stream and are drawn, quenched and transported to a collection surface. The high velocity air, accelerated and distributed in a radial manner, contributes to the attenuation or drawing of the radially extruded thermoplastic melt fibers. The accelerated air velocities contribute to the placement or "laydown" of fibers onto a collection surface such as a circular fiber collector surface or collector plate such that uniform basis weight self-bonded, fibrous, nonwoven webs are formed that exhibit improved properties, including increased tensile strength and more balanced physical properties in the machine direction and cross-machine direction and have a very uniform basis weight with BWUI's of $1.0 \pm 0.05$ determined from average basis weights having standard deviations less than 10%. Preferably, the filament deniers are in the range of about 0.5 to about 20, which for polypropylene corresponds to filament diameters of about 5 to about 220 microns.

The uniform basis weight, self-bonded, fibrous, nonwoven webs are produced by allowing the extruded thermoplastic fibers to contact each other as they are deposited on the collection surface. Many of the fibers, but not all, adhere to each other at their contact points, thereby forming the self-bonded, fibrous nonwoven web. Adhesion of the fibers may be due to material bonding such as fusion of hot fibers as they contact each other, to entanglement of fibers with each other or to a combination of fusion and entanglement. Generally, the adhesion of the fibers is such that the nonwoven web, after being laid down, but before further treatment, has sufficient MD and CD strengths to allow handling of the web without additional treatment, such as prebonding such as that generally required by spunbonded nonwoven webs.

The self-bonded nonwoven fabric conforms to the shape of the collection surface which can have various shapes, such as a cone-shaped inverted bucket, a moving screen or a flat surface in the shape of an annular strike plate located slightly below the elevation of the die and with the inner diameter of the annular strike plate being at an adjustable, lower elevation than the outer diameter of the strike plate.

When an annular strike plate is used as the collection surface, fibers are bonded together during contact with each other and with the annular strike plate, and a nonwoven fabric is produced which is drawn back through the aperture of the annular strike plate as a tubular fabric. A stationary spreader can be supported below the annular strike plate to spread the fabric into a flat, two-ply fabric which can be collected by a take-up means such as a pull roll and winder and the like. In the alternative, a knife-splitter arrangement can be used to cut and split the tubular, two-ply fabric into a single-ply fabric which can be collected by a take-up means such as a pull roll and winder.

The process stability can be affected by the temperature of the thermoplastic melt. The melt temperature must be sufficiently high so as to enable drawdown, but not too high so that thermal degradation of the thermoplastic results. Process parameters which can influence fiber formation from the thermoplastic polymers include: the spinnerette orifice design, dimension and number; the extrusion rate of polymer through the orifices; the quench air velocity; and the rotational speed of the die. The filament diameter can be influenced by all of the above parameters with filament diameter typically increasing with larger diameter spinnerette orifices, higher extrusion rates per orifice, lower quench air velocity and lower rotary die rotation with other parameters remaining constant. Productivity can be influenced by process parameters such as the dimension and number of spinnerette orifices, the extrusion rate and, for a given denier fiber, the rotary die rotation and the like.

In general, any suitable thermoplastic resin can be used in making the uniform basis weight self-bonded, fibrous, nonwoven webs including polyolefins of branched and straight-chained olefins such as low density polyethylene, linear low density polyethylene, high density polyethylene, polypropylene, polybutene, combinations thereof and the like. The term "polyolefins" is meant to also include homopolymers, copolymers and blends of polymers prepared from at least 50 wt % of an unsaturated hydrocarbon monomer. Examples of such polyolefins include polyethylene, polystyrene, polyvinyl chloride, polyvinyl acetate, polyvinylidene chloride, polyacrylic acid, polymethacrylic acid, polymethyl methacrylate, polyethyl acrylate, polyacrylamide, polyacrylonitrile, polypropylene, polybutene-1, polybutene-2, polypentene-1, polypentene-2, poly-3-methylpentene-1, poly-4-methylpentene-1, polyisoprene, polychloroprene and the like. Preferred polyolefins include polypropylene, linear low density polyethylene, blends of polypropylene and polybutene, and blends of polypropylene and linear low density polyethylene.

The polypropylene (PP) used by itself or in blends with polybutene (PB) and/or linear low density polyethylene (LLDPE) preferably has a melt flow rate in the range of about 10 to about 80 dg/min as measured by ASTM D-1238. Blends of polypropylene and polybutene and/or linear low density polyethylene provide self-bonded nonwoven webs with a softer hand such that the web has greater flexibility and/or less stiffness.

Blends of polypropylene and PB can be formulated by metering PB in liquid form into a compounding extruder by any suitable metering device by which the amount of PB being metered into the extruder can be controlled. PB can be obtained in various molecular weight grades with high molecular weight grades typically requiring heating to reduce the viscosity for ease of transferring the PB. A stabilizer additive package can be added to the blend of polypropylene and PB if desired. Polybutenes suitable for use can have a number average molecular weight ($M_n$) measured by vapor phase osmometry of about 300 to about 3000. The PB can be prepared by well-known techniques such as the Friedel-Crafts polymerization of feedstocks comprising isobutylene, or they can be purchased from a number of commercial suppliers such as Amoco Chemical Company, Chicago, Ill., which markets polybutenes under the tradename Indopol ®. A preferred Mn for the PB is in the range of about 300 to about 2500.

PB can be added directly to PP or it can be added via a masterbatch prepared by adding PB to PP at weight ratios of 0.2 to 0.3 based on polypropylene in a mixing device such as a compounding extruder with the resulting masterbatch blended with polypropylene in an amount to achieve the desired level of PB. For making the self-bonded, nonwoven webs used in making some embodiments of the composites in this invention, the weight ratio of PB typically added to polypropylene can range from about 0.01 to about 0.15. When a weight ratio of PB below about 0.01 is used, very little of the beneficial effects such as better hand and improved softness are shown in the blends, and when polybutene is added at a weight ratio above about 0.15, minute amounts of PB can migrate to the surface which may detract from the fabric appearance. Blends of polypropylene and PB can have a weight ratio of polypropylene in the range of about 0.99 to about 0.85, preferably about 0.99 to about 0.9, and a weight ratio of PB in the range of about 0.01 to about 0.15, preferably about 0.01 to about 0.10.

Blends of polypropylene and LLDPE can be formulated by blending PP resin in the form of pellets or powder with LLDPE in a mixing device such as a drum tumbler and the like. The resin blend of PP and LLDPE with optional stabilizer additive package can be introduced to a polymer melt mixing device such as a compounding extruder of the type typically used to produce polypropylene product in a polypropylene production plant and compounded at temperatures between about 150° and about 260° C. Although blends of polypropylene and LLDPE can range from a weight ratio of nearly 1.0 for polypropylene to a weight ratio of nearly 1.0 for LLDPE, typically, the blends of polypropylene and LLDPE useful for making self-bonded webs used in the composites of this invention can have a weight ratio of polypropylene in the range of about 0.99 to about 0.85, preferably in the range of about 0.98 to about 0.92, and a weight ratio of LLDPE in the range of about 0.01 to about 0.15, preferably in the range of about 0.02 to about 0.08. For weight ratios less than 0.01 the softer hand properties imparted from the LLDPE are not obtained and for weight ratios above 0.15 less desirable physical properties and a smaller processing window are obtained.

The LLDPE can be random copolymers of ethylene with 1 to 15 wt % of higher olefin co-monomers such as propylene, n-butene-1, n-hexene-1, n-octene-1 or 4-methylpentene-1 produced over transition metal coordination catalysts. Such linear low density polyethylenes can be produced in liquid phase or vapor phase processes. The preferred density of the linear low density polyethylene is in the range of about 0.91 g/cc.

The self-bonded nonwoven web can be either a single-ply or a multiple-ply web. For example, a two-ply web can be used such that a layer of a self-bonded web having a nominal basis weight of about 7.0 g/m² comprises two single-ply self-bonded webs each having a nominal basis weight of 3.5 g/m². The two-ply self-bonded web enhances the excellent uniform basis weight of the single plies that make up the two-ply webs. Although the self-bonded, nonwoven web can have a post-treatment, such as thermal bonding, point-bonding and the like, one embodiment of producing the self-bonded, nonwoven web employs no post-treatment of the self-bonded web.

Additives such as colorants, pigments, dyes, opacifiers such as $TiO_2$, UV stabilizers, fire retardant compositions, processing stabilizers and the like can be incorporated into the polypropylene and blends.

In forming the porous film composite the oriented microporous film is adhered to the second layer of material such as polymeric foam material, woven and nonwoven fabric by thermobonding or adhesion bonding via an adhesive composition. The woven or nonwoven fabrics include any materials which have not only sufficiently large voids or pores but also mechanical strength as supports for the vapor-permeable porous film layer. Specifically, they include not only usual woven or nonwoven fabrics, but also knits, papers and other highly porous sheets. Particularly preferred among others are materials such as carded webs, spunbond fabrics, melt-blown fabrics, polymeric foam product and self-bonded nonwoven webs. The nonwoven fabrics need not be made of long staple fibers only but may also be made of short fibers intertwined or spot-fused with each other.

The adhesion of the porous film to the woven or nonwoven fabric by thermobonding is generally carried out at a temperature of about 70° to about 150° C. under a pressure of 0.1 to 10 kg/cm². Though the temperature and pressure ranges are more or less variable with the composition of the film and the type of the woven or nonwoven fabric, too low of temperature and pressure cannot act to adhere the film to the woven or nonwoven fabric sufficiently, and too high of temperature and pressure leads to a decrease in waterproofness of the resulting composite sheet.

More specifically, the thermobonding is conducted preferably at about 80° to about 150° C. on the side of the woven or nonwoven fabric and at about 75° to about 95° C. on the side of the porous film under pressure of 1.0 to 10 kg/cm². Preferably, thermobonding is conducted at about 110° to about 130° C. on the side of the woven or nonwoven fabric and at about 85° to about 95° C. on the side of the film, under a pressure of 5 to 10 kg/cm².

The thermobonding of the porous film to the woven or nonwoven fabric is preferably carried out by using heat rolls with various arrangements of film and woven or nonwoven fabric possible. Specifically, one porous film can be adhered to one woven or nonwoven fabric or one film can be sandwiched by two woven or nonwoven fabrics. In addition, one woven or nonwoven fabric can be sandwiched by two porous films.

As an alternate to thermobonding the layers of porous film and other material may be adhered to each by the application of a layer of an adhesive composition such as a hot melt adhesive. Typically, the hot melt adhesive is applied by a spray technique at a rate sufficient to achieve adhesion but at a low enough level to retain breathability in the porous film layer.

The porous film composites of the present invention comprising microporous films and self-bonded nonwoven webs can be produced by adhering at least one layer of a uniform basis weight self-bonded web having a plurality of substantially randomly disposed, substantially continuous filaments having a BWUI of 1.0±0.05 determined from average basis weights having standard deviations of less than 10% to at least one layer of an oriented polymeric microporous film. Bonding processes for adhering the web and microporous film layers can be bonding techniques such as thermal, chemical-/adhesion and ultrasonic bonding. These bonding techniques can be either point- or area-bonding with the choice of bonding dependent upon the ultimate application for the composite.

In the thermal bonding process, a heated calender is used comprising heated rolls between which are passed the individual layers of the composite to be bonded. The calender rolls can be made from steel, steel wool and the like and can have working widths up to 3 m or greater and diameters which have the required stiffness and strength to correspond to the working width of the calender. The calender rolls can be oriented such that the composites can pass between the calender rolls in essentially a horizontal or a vertical direction. One or both rolls can have embossing patterns for point-bonding and can be maintained at a desired temperature by a heating means such as electrical heating, tempered-oil heating and the like. The bonding pattern of the embossing rolls can be a regular or intermitten pattern. Typically, an intermittent pattern is used with the area of the composite surface occupied by bonds ranging from about 5 to 50 percent of the surface area, preferably about 10 to about 25 percent of the surface area. The bonding can be done as pointbonding, continuous stripe-, or discontinuous stripe-bonding with the intent of the bonding being to keep the layers of the composites from delaminating, while at the same time not forming an overly stiff composite product. A thermal bonding process useful to form the composites of the present invention employs a calender with a hard steel, embossing roll and a hard steel, smooth roll with the embossing roll having an embossing pattern of 256 squares/in$^2$ with the squares angled diagonally such that the squares present a diamondlike appearance in the machine or cross-machine direction and with the bonding area representing a nominal 16% of the total surface area. For the present invention, thermal bonding is the preferred bonding process for ease of operation and utilization of typical existing equipment.

The temperature, pressure and embossing patterns on the embossing roll and speed of the nonwoven webs fed to the calender depend on the thermoplastic material used to produce the self-bonded web and the porous film as well as the type of composite desired in terms of stiffness, strength, vapor-permeability, liquid-impermeability and other properties. Calender process parameters such as the temperature of the embossing rolls, the pressure exerted by the rolls on the composite and the speed of the layers fed to the calender can be varied to achieve the desired composite. The temperature of the calender rolls can range from about 90° to about 235° C., the pressure exerted on the composite by the rollers can range from about 50 to 750 pounds per linear inch (pli) in the calender nip and the speed of the nonwoven webs fed to the calender can range from about 0.05 to about 7.5 m/s.

If the calender roll temperatures are too low for the particular composite being formed, the layers of the resulting composite may tend to delaminate because of insufficient bonding of the layers; however, if the calender roll temperatures are too high, the web and porous film layers will fuse and form a substantially impervious film and thereby negate the air permeability properties of the composite and may also produce composites with less desirable tensile properties. A secondary calendering operation employing two or more smooth rolls can be employed after the thermobonding process, if desired.

Although the self-bonded nonwoven web can have post-treatment, such as calendering, in one method of producing a multi-layer nonwoven web composite of the present invention no post-treatment of the self-bonded web is used before the composite is formed by thermobonding layers of self-bonded webs to the microporous film layer.

For composites of microporous films and self-bonded nonwoven webs made of polypropylene, the embossing roll or the smooth roll can be in contact with the porous film layer and can have a roll temperature in the range of about 110° to about 205° C. and the smooth roll can be in contact with the self-bonded web and can have a smooth roll temperature in the range of about 105° to about 175° C. Before the self-bonded web is fed to the calender rolls, a porous film from a porous film line or an unwind roll is layered onto the self-bonded web before passing between the calender rolls. The porous film is preferably made from the polymeric composition described above and has a film thickness of about 0.5 mil or greater. The pressure between the embossing roll and the smooth roll is maintained at about 50 to about 750 pli and the composites are produced at speeds of about 0.05 to about 7.5 m/s. For composites in which the porous film is the intermediate layer between two layers of self-bonded webs, both the embossing roll and the smooth roll are in contact with the self-bonded nonwoven webs.

The weight ratio of the self-bonded nonwoven web to the porous film in the composite can range from about 0.2 to about 15. For lightweight composites of less than 35 g/m$^2$ total base weight the preferred weight ratio is about 0.5/1 and for composites having total basis weights of 170 g/m$^2$ or greater the preferred weight ratio is about 12/1. The basis weight of the self-bonded nonwoven web used as at least one layer of the porous film composite of this invention can be from about 5 to about 200 g/m$^2$.

One method of making the porous film composite of the present invention comprises the steps of:

providing to a nip between two counter-rotating rolls with at least one roll embossed with a bonding pattern, at least one layer of a uniform basis weight self-bonded web having a BWUI of 1.0±0.05 determined from average basis weights having standard deviations of less than 10% comprising a plurality of substantially randomly disposed, substantially continuous thermoplastic filaments and at least one layer of an oriented polymeric microporous film prepared from the compositions and by the processes described above and bonding the self-bonded nonwoven web and the polymeric microporous film together at a speed of about 0.05 to about 7.5 m/s in the nip with an embossing roll temperature maintained at about 90° to about 235° C. and a smooth roll temperature maintained at about 90° to about 235° C. with a pressure between the embossing roll and the smooth roll maintained at about 50 to about 750 pli. To facilitate the preparation of composites having the desired physical properties including basis weight, MVTR, appearance and feel the preferred basis weight of the self-bonded web is about 3.5 g/m$^2$ or greater and the filaments making up the web have deniers preferably in the range of about 0.5 to about 20. The preferred thickness of the porous film is about 0.1 mil or greater.

For a porous film composite comprising a layer of a uniform basis weight self-bonded nonwoven web and a layer of a polymeric porous film, a particularly useful application for the composite is house wrap. The composite properties for this type of application include a weight ratio of self-bonded web to porous film in the range of about 2.0/1 to about 3.0/1 with the basis weight of the self-bonded nonwoven web ranging from about 30 to about 100 g/m$^2$ and the basis weight of the porous film ranging from about 17 to about 34 g/m$^2$. The MVTR of the composite is in the range of about 500 to about 7,500 g/m$^2$/24 hr as measured according to ASTM E-96, procedure E.

In one embodiment, the porous film composite of this invention is a three-layer composite having a basis weight in the range of about 50 to about 200 g/m$^2$ produced by thermobonding a layer of a uniform basis weight self-bonded nonwoven web having a basis weight of about 20 to about 115 g/m² between a carded web layer of polypropylene fibers having a basis weight of about 10 to about 35 g/m² and a microporous film layer having a basis weight of about 20 to about 50 g/m². This composite finds use in diaper applications in which the carded web layer contacts the skin, the self-bonded nonwoven web layer contributes stregth to the composite and the microporous layer provides a liquid impermeable layer.

In one embodiment, the porous film composite of the present invention is a three-layer composite having a basis weight in the range of about 30 to about 200 g/m² produced by thermal point-bonding a layer of a uniform basis weight self-bonded nonwoven web to each side of a polymeric porous film which has a particularly advantageous application as a vapor-permeable and liquid-impermeable construction fabric such as house wrap, vehicle covers and the like.

For a three-layer composite comprising a self-bonded nonwoven web thermobonded to both sides of a oriented polymeric microporous film, typical applications vary according to the composite basis weight. Three-layer composites having vapor-permeable and liquid-impermeable properties and a basis weight of about 20 to about 85 g/m² are useful as protective construction fabric for medical apparel, general protection and chemical protection and liners for sporting apparel. Preferably these fabrics have a MVTR of about 1,500 g/m²/24 hr or greater.

An intermediate basis weight three-layer composite having a basis weight in the range of about 50 to about 140 g/m² is useful as a vapor-permeable and liquid-impermeable construction fabric such as house wrap and the like. Higher basis weight three-layer composites having basis weights in the range of about 140 to about 200 g/m² are useful as covers such as for automobiles, motor bikes, stationary equipment and the like. The weight ratio of the self-bonded web to porous film can range from about 5.0/1 to about 12.0/1. The MVTR depends on the particular application and can range from about 500 to about 5,000 g/m²/24 hr determined by ASTM E-96, procedure E.

In order to provide a vapor permeable and liquid impermeable fabric of sufficient strength and durability the composites of the present invention are provided with uniform basis weight self-bonded webs bonded to polymeric porous films. The self-bonded web comprising a plurality of substantially randomly disposed, substantially continuous thermoplastic filaments used as the protective layer has a very uniform basis weight. The uniform basis weight of the self-bonded web allows lower basis weight self-bonded nonwoven webs to be used to provide strength and durability to the composites, and benefits the consumer with a lighter weight and more economical product.

Among the advantages obtained from the porous film composites of the present invention is a composite comprising two layers of self-bonded nonwoven web calendered with a porous film layer between the nonwoven webs to form a composite with improved MVTR properties together with excellent waterproofness for use in protective clothing applications and air-infiltration barrier applications.

Other self-bonded nonwoven web composites can be formed, including composites having a self-bonded web and a porous film laminated together with a coating material layer, composites having a self-bonded web laminated to a foamed polymer sheet and a porous film layer and the like. The self-bonded web of the composite has the advantage that when laminating porous films of polypropylene-based resins to a woven fabric by using a hot melt or other adhesive, the self-bonded web is easier to adhere to than straight polypropylene film which is particularly advantageous when laminating the polypropylene film to woven fabric for sporting apparel.

Test procedures used to determine properties reported in the examples are as follows:

Tensile Strength and Elongation—Test specimens are used to determine tensile strength and elongation according to ASTM Test Method D-1682. Grab tensile strength was measured in the MD on 1-inch wide samples of the fabric or in the CD and was reported in units of lbs or grams. Elongation was measured in the MD or in the CD and is reported in units of %. A high value is desired for tensile strength. Lower values are desired for elongation.

Fiber Denier—The fiber diameter was determined by comparing a fiber specimen sample to a calibrated reticle under a microscope with suitable magnification. The fiber denier was calculated from known polymer densities.

Basis Weight—The basis weight for a test sample was determined by ASTM Test Method D-3776 Option C.

Basis Weight Uniformity Index—The BWUI was determined for a nonwoven web by cutting a number of unit area and larger area samples from the nonwoven web. The method of cutting can range from the use of scissors to stamping out unit areas of material with a die which will produce a consistently uniform unit area sample of nonwoven web. The shape of the unit area sample can be square, circular, diamond or any other convenient shape. The unit area is 1 in², and the number of samples is sufficient to give a 0.95 confidence interval for the weight of the samples. Typically, the number of samples can range from about 40 to 80. From the same nonwoven web an equivalent number of larger area samples are cut and weighed. The larger samples are obtained with appropriate equipment with the samples having areas which are N times larger than the unit area samples, where N is about 12 to about 18. The average basis weight was calculated for both the unit area sample and the larger area sample, with the BWUI ratio determined from the average basis weight of the unit area divided by the average basis weight of the larger area. Materials which have unit area and/or larger area average basis weights determined with standard deviations greater than 10% are not considered to have uniform basis weights as defined herein.

Moisture Vapor Transmission Rate—The MVTR was measured according to ASTM E 96-80, procedure E. A total of four 3-in diameter disks were cut out of each film sample to be tested and tested for MVTR. The test was repeated on two disks from each film. A disk specimen was sealed to an aluminum cup containing desiccant and placed in a 37.8° C., 90% relative humidity environment, and the weight gain of the cup was monitored as a function of time. The test was run for two days and the MVTR calculated from the slope of the weight gain versus elapsed time line.

Waterproofness—The hydrostatic waterproofness of a material was measured according to ASTM D 751-79, procedure 1. In this test, water pressure on the undeside surface of the material under test is gradually increased until leakthrough was observed on the surface. This test was performed on both film and composite samples without a backing support, as well as on backing-supported samples in which a woven nylon backing fabric was used on the top side of the test specimen to prevent the specimen from bursting due to the applied stress of the water before leakthrough was detected.

ORIENTED POROUS FILM PREPARATION

Oriented porous films were prepared from compositions of an ethylene/propylene block copolymer, a polypropylene homopolymer (PP), a low molecular weight polypropylene, a beta-spherulite nucleating agent and calcium carbonate. The ethylene/propylene block copolymer, Hifax RA-061 from Himont, had an ethylene content of 40 wt % and a nominal MFR of 1.0 dg/min. The $CaCO_3$ and all or a part of the polypropylene were supplied from a PP/$CaCO_3$ masterbatch (PF-85F) from A. Schulman Co., which had a MFR of 6 to 8 and contained 40 wt % of $CaCO_3$ having a mean particle size of 0.8 microns. If additional polypropylene was required, polypropylene 6214 resin from Amoco Chemical Co. having a nominal MFR of 1.8 to 2.7 dg/min was used. The low molecular weight polypropylenes were Proflow resins from Polyvisions Inc. having melt viscosities in the range of about 50 to about 1,000 poise measured at a shear rate of 136 $sec^{-1}$ and a temperature of 190° C. The compositions also contained 2 ppm of red quinacridone dye, Q-dye, as a beta-spherulite nucleant in the form of a masterbatch of Q-dye and polypropylene prepared by adding 0.2 g of Q-dye to 1000 g of polypropylene powder. From the masterbatch, 17.5 g were added to 1982.5 g of polypropylene powder which had 0.18 wt % of an antioxidant and processing stabilizer package. The compositions were compounded and pelletized with a 63.5 mm Prodex extruder and then cast into film from a 63.5 mm Prodex extruder having a 61 cm wide die having a die lip gap of 10 mils onto a heated chill roll having a surface temperature of 110° C. The thickness of the cast film was 4.5 to 5 mils and the speed of the extruder screw was set at 48 to 50 rpm which produced an output rate of about 25 kg/hr. The cast-film line speed was about 0.125 m/s and the MD draw ratio was 2:1. The film widths at the MD inlet and the MD outlet were 50.8 cm and 48.3 cm, respectively. The stretching in the MD direction was performed at a temperature of 60° C. and the annealing section was set at 71° C. The TD stretching was performed on a Tenter Frame at draw ratios of 2:1 to 3:1 and draw temperatures in the range of 105° to 120° C. with the highest temperature that the film experienced being in the annealing zone of the Tenter Frame oven. In this last zone the track separation was reduced by 10 to 15 cm in order to allow some relaxation of the film. The film line speed in the TD section was 0.75 m/s.

The following examples further elaborate the present invention although it will be understood that these examples are for purposes of illustration and are not intended to limit the scope of the invention.

EXAMPLE 1

A three-layer uniform basis weight self-bonded nonwoven web and porous film composite was prepared using RFX ® fabric as the self-bonded nonwoven web for the outer two layers and an oriented porous film as an intermediate layer between the layers of the RFX ® fabric. The RFX ® fabric was a uniform basis weight, self-bonded, fibrous nonwoven web of substantially randomly disposed, substantially continuous thermoplastic filaments wound on an unwind roll was prepared in the form of a two-ply web from polypropylene having a nominal melt flow rate of 35 dg/min and had a uniform basis weight of 17 g/$m^2$ with a BWUI within the range of 1.0±0.05 and a standard deviation of average basis weights or less than 10%. The oriented porous film was prepared as described above under Oriented Porous Film Preparation section from a composition of 50 wt % of the ethylene/propylene block copolymer, 35 wt % of the PP/$CaCO_3$ masterbatch for a composition concentration of 14 wt % $CaCO_3$, 3 wt % of a Proflow resin having a melt viscosity of 74 poise at 136 $sec^{-1}$ and 190° C., and 12 wt % of the polypropylene homopolymer. The porous film had a thickness of 1.6 mil, a basis weight of 31.5 g/$m^2$ and was wound on an unwind roll. The self-bonded webs and porous film were fed from unwind rolls to a calendering line and thermally bonded together on an in-line, 56 cm wide calender with a hard steel, embossed calender roll and a hard steel, smooth calender roll with both rolls maintained at a temperature of 127° C. The embossing pattern was 256 squares/$in^2$ with the squares angled diagonally such that they presented a diamond-like appearance in the machine or cross-machine direction with the bonding area being a nominal 16% of the surface area of the composite. A pressure of 150 pli was maintained on the three layers so that the layers were bonded to form a three-layer porous film and nonwoven web composite at a speed of 0.076 to 0.091 m/s. A composite was produced which maintained its waterproofness and the MVTR of the composite was reduced by only 4.9% from that of the porous film. The physical properties of the composite components and of the composite are summarized in Table I.

EXAMPLE 2

A three-layer uniform basis weight self-bonded nonwoven web and porous film composite was prepared using RFX ® fabric as the self-bonded nonwoven web for the outer two layers and an oriented porous film as an intermediate layer between the two layers of the RFX ® fabric. The RFX ® fabric wound on an unwind roll was prepared in the form of a two-ply web from a polypropylene having a nominal melt flow rate of 35 dg/min and has a uniform basis weight of 17 g/$m^2$ with a BWUI within the range of 1.0±0.05 and a standard deviation of average basis weights of less than 10%. The oriented porous film was prepared as described in the Oriented Porous Film Preparation section from a blend composition of 50 wt % of the ethylene/propylene block copolymer, 35 wt % of the PP/$CaCO_3$ masterbatch for a concentration of 14 wt % $CaCO_3$ in the composition, 6 wt % of a Proflow resin having a melt viscosity of 346 poise at a shear rate of 136 $sec^{-1}$ and a temperature of 190° C. and 9 wt % of polypropylene homopolymer. The porous film had a thickness of 1.9 mil and a basis weight of 28.5 g/$m^2$ and was wound on an unwind roll. The self-bonded webs and porous film were fed from unwind rolls to a calendering line and thermally bonded together on an in-line, 56 cm wide calender with a hard steel, embossed calender roll and a hard steel, smooth calender roll with both rolls maintained at a temperature of 127° C. The embossing pattern was 256 squares/$in^2$ with the squares angled diagonally such that the squares presented a diamond-like appearance in the machine or cross-machine direction with the bonding area being a nominal 16% of the surface area of the composite. A pressure of 150 pli was maintained on the three layers to bond the layers together and form a three-layer porous film composite at a speed of 0.076 to 0.091 m/s. A composite was produced which maintained its waterproofness and the MVTR of the composite was reduced by only 11.1% from that of the porous film. The physical properties of the composite components and of the composite are summarized in Table I.

EXAMPLE 3

A two-layer porous film composite was prepared using RFX ® fabric as the self-bonded nonwoven fabric layer and an oriented porous film as the other layer. The RFX ® fabric wound on an unwind roll was prepared in the form of a two-ply web from a polypropylene having a nominal melt flow rate of 35 dg/min and had a uniform basis weight of 17 g/m² with a BWUI within the range of 1.0±0.05 and a standard deviation of average basis weights of less than 10%. The oriented porous film was prepared as described in the above Oriented Porous Film Preparation section and with the composition described in Example 2. The porous film had a thickness of 1.9 mil, a basis weight of 28.5 g/m² and was wound on an unwind roll. The porous film and self-bonded web were fed from unwind rolls to a calendering line as described in Example 2. A pressure of 150 pli was maintained on the two layers to thermally bond the layers together and form a two-layer porous film and self-bonded nonwoven web composite at a speed of 0.076 to 0.091 m/s. A composite was produced which maintained its waterproofness and the MVTR of the composite was reduced by only 0.6% from that of the porous film. The physical properties of the composite components and of the composite are summarized in Table I.

EXAMPLE 4

A three-layer porous film composite was prepared using RFX ® fabric as the self-bonded nonwoven web for the intermediate layer between a layer of a carded web of polypropylene fibers and a layer of porous film. The carded web had a basis weight of 23.8 g/m². The RFX ® fabric wound on an unwind roll was prepared in the form of a two-ply web from polypropylene having a nominal melt flow rate of 35 dg/min and had a uniform basis weight of 17 g/m² with a BWUI within the range of 1.0±0.05 and a standard deviation of average basis weights less than 10%. The oriented porous film was prepared as described in the Oriented Porous Film Preparation section from a composition of 50 wt % of the ethylene/propylene block copolymer, 35 wt % of the PP/CaCO₃ masterbatch for a concentration of 14 wt % CaCO₃, 3 wt % of a Proflow low molecular weight resin having a melt viscosity of 74 poise at 136 sec$^{-1}$ and 190° C., and 12 wt % of the polypropylene homopolymer. The porous film had a thickness of 2.0 mil, a basis weight of 23.8 g/m² and was wound on an unwind roll. The self-bonded web, carded web and porous film were fed from unwind rolls to a calendering line and thermally bonded on an in-line, 56-cm wide calender with a hard steel, embossed calender roll and a hard steel, smooth calender roll with both rolls maintained at a temperature of 127° C. The embossing pattern was 256 squares/in² with the squares angled diagonally such that the squares presented a diamond-like appearance with the bonding area being a nominal 16% of the surface area of the composite. A pressure of 150 pli was maintained on the three layers to bond the layers together and form a three-layer porous film composite at a speed of 0.076 to 0.091 m/s. A composite was produced which maintained its waterproofness and the MVTR of the composite was reduced by only 6.5% from that of the porous film. The physical properties of the composite components and of the composite are summarized in Table I.

TABLE 1
COMPONENT AND COMPOSITE PROPERTIES

| Property | Example 1 | Example 2 | Example 3 | Example 4 |
|---|---|---|---|---|
| Porous Film | | | | |
| Thickness, mil | 1.6 | 1.9 | 1.9 | 2.0 |
| Basis Weight, g/m² | 31.5 | 28.5 | 28.5 | 23.8 |
| Porosity, % | 58 | 62 | 62 | 60 |
| MVTR, g/m²/24 hr | 5,680 | 3,320 | 3,320 | 3,850 |
| Waterproofness | | | | |
| Impact Penetration, g | nil | nil | nil | nil |
| Hydrostatic Resistance, in | >40 | >40 | >40 | >40 |
| Grab Strength, lb | | | | |
| MD | 11.8 | 14.1 | 14.1 | 12.8 |
| TD | 9.1 | 9.7 | 9.7 | 9.9 |
| Self-Bonded Web | | | | |
| Composition | PP | PP | PP | PP |
| Basis Weight, g/m² | 17 | 17 | 17 | 17 |
| Composite | | | | |
| Basis Weight, g/m² | 62.1 | 58.7 | 45.1 | 60.1 |
| MVTR, g/m²/24 hr | 5,400 | 2,950 | 3,300 | 3,600 |
| Waterproofness | | | | |
| Impact Penetration, g | nil | nil | nil | nil |
| Hydrostatic Resistance, in | >40 | >40 | >40 | >40 |
| Grab Strength, lb | | | | |
| MD | 22.8 | 28.0 | 14.6 | 27.1 |
| TD | 22.4 | 24.2 | 11.0 | 16.7 |

That which is claimed is:

1. A porous film composite comprising,
    at least one layer of an oriented microporous film having microvoid cells and interconnecting pores between the cells prepared by a process comprising the steps of:
    (1) forming a film from a polymeric composition comprising,
        about 30 to about 90 parts by weight of a component A comprising an ethylene-propylene block copolymer having an ethylene content of about 10 to about 50 wt %,
        about 5 to about 40 parts by weight of a component B comprising a polypropylene homopolymer or random copolymer of propylene having up to about 10 wt % of a comonomer of ethylene or an α-olefin of 4 to 8 carbon atoms,
        about 1 to about 20 parts by weight of a component C comprising a low molecular weight polypropylene having a melt viscosity of about 50 to about 1,000 poise measured at a shear rate of 136 sec$^{-1}$ and 190° C.,
        0 to about 30 parts by weight, per 100 parts by weight of components A, B and C, of a component D comprising calcium carbonate, and
        0 to about 50 ppm, per 100 parts by weight of components A, B and C, of a component E comprising a beta-spherulite nucleating agent with the proviso that component C is present at
        (a) about 5 to about 20 parts by weight when the polymeric composition is substantially free of component D or of components D and E, and
        (b) about 1 to about 10 parts by weight when the polymeric composition has about 0.1 to about 10 ppm of component E and about 5 to about 30 parts by weight of component D, (2) heating said film at a temperature of about 35° to about 135° C., and (3) stretching said heated film in at least one direction at a stretch ratio of about 1.5 to about 10, wherein said oriented microporous film layer is adhered to at least one layer of a material selected from the group consisting of a carded web, a polymeric foam product, a woven fabric, a spunbond fabric, a meltblown fabric and a self-bonded, fibrous, nonwoven web.

2. The porous film composite of claim 1 wherein said beta-spherulite nucleating agent comprises a red quinacridone dye.

3. The porous film composite of claim 2 wherein said red quinacridone dye has the structural formula:

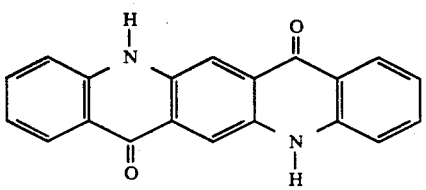

4. The porous film composite of claim 1 wherein said low molecular weight polypropylene has a melt viscosity of about 70 to about 550 poise measured at a shear rate of 136 sec$^{-1}$ and 190° C.

5. The porous film composite of claim 1 wherein said ethylene-propylene block copolymer has an ethylene content of about 30 to about 45 wt %.

6. The porous film composite of claim 1 wherein said self-bonded nonwoven web comprises a uniform basis weight, self-bonded fibrous nonwoven web comprising a plurality of substantially randomly disposed substantially continuous thermoplastic filaments wherein said web has a Basis Weight Uniformity Index of 1.0±0.05 determined from average basis weights having standard deviations of less than 10%.

7. The porous film composite of claim 6 wherein said thermoplastic filaments have deniers in the range of about 0.5 to about 20.

8. The porous film composite of claim 6 wherein said thermoplastic filaments comprise a thermoplastic selected from the group consisting of polypropylene, high-density polyethylene, low density polyethylene, linear low density polyethylene, a blend of polypropylene and polybutene and a blend of polypropylene and linear low density polypropylene.

9. The porous film composite of claim 6 wherein said thermoplastic filaments comprise a polypropylene having a melt flow rate measured according to ASTM D-1238 of about 10 to about 80 dg/min.

10. The porous film composite of claim 6 wherein said thermoplastic filaments comprise a blend of a polypropylene and a polybutene wherein said polypropylene has a melt flow rate measured according to ASTM D-1238 of about 10 to about 80 dg/min and a weight ratio of about 0.99 to about 0.85 and wherein said polybutene has a number average molecular weight in the range of about 300 to about 2,500 and a weight ratio of about 0.01 to about 0.15.

11. The porous film composite of claim 6 wherein said thermoplastic filaments comprise a blend of a polypropylene and a linear low density polyethylene wherein said polypropylene has a melt flow rate measured according to ASTM D-1238 of about 10 to about 80 dg/min and a weight ratio of about 0.99 to about 0.85 and wherein said linear low density polyethylene has a density in the range of about 0.91 to about 0.94 g/cc and a weight ratio of about 0.01 to about 0.15.

12. The porous film composite of claim 1 having a moisture vapor transmission rate determined according to ASTM E-96, procedure E, of at least 500 g/m$^2$/24 hr.

13. The porous film composite of claim 3 wherein said polymeric composition comprises, per 100 parts by weight of components A and B, about 40 to about 90 parts by weight of component A,
about 5 to about 40 parts by weight of component B,
about 1 to about 10 parts by weight of component C,
having a melt viscosity of about 70 to about 550 poise measured at a shear rate of 136 sec$^{-1}$ and 190° C.,
about 5 to about 30 parts by weight of component D, and
about 0.01 to about 10 ppm by weight of component E.

14. The porous film composite of claim 13 wherein said ethylene-propylene block copolymer has an ethylene content of about 30 to about 45 wt %.

15. The porous film composite of claim 14 wherein said composite has a moisture vapor transmission rate of about 2,500 g/m$^2$/24 hr or greater determined according to ASTM E-96, procedure E.

16. The porous film composite of claim 15 in the form of a vapor-permeable and liquid-impermeable construction fabric.

17. The porous film composite of claim 13 comprising one layer of said oriented microporous film, one layer of said carded web comprising polypropylene fibers and having a basis weight in the range of about 10 to about 35 g/m$^2$ and one layer a uniform basis weight, self-bonded fibrous nonwoven web comprising a plurality of substantially randomly disposed substantially continuous thermoplastic filaments wherein said web has a Basis Weight Uniformity Index of 1.0±0.05 determined from average basis weights having standard deviations of less than 10% wherein the self-bonded nonwoven web layer is between said carded web layer and said oriented microporous film layer.

18. A porous film composite comprising,
at least one layer of an oriented polymeric porous film having polygonal cells with average dimensions of about 5 to about 30 microns and interconnecting pores between the cells having average diameters of about 0.2 to about 20 microns prepared by a process comprising the steps of:

(a) forming a film from a polymeric composition comprising about 70 to about 95 parts by weight of a homopolymer or random copolymer of propylene having up to about 10 wt % of a comonomer of ethylene or an α-olefin of 4 to 8 carbon atoms, about 5 to about 30 parts by weight of an ethylene-propylene block copolymer having an ethylene content of about 10 to about 50 wt % and a nucleating agent capable of producing beta-spherulites;

(b) cooling said film below the crystallization temperature of said composition to form at least 20 wt % of beta-spherulites in the film;

(c) extracting selectively said beta-spherulites in an amount corresponding up to 15 wt % of the composition from the cooled film with an extraction solvent selected from the group consisting of toluene, carbon tetrachloride and xylene to form a porous film; and (d) orienting the porous film by heating the porous film at a temperature of about 110° to about 135° C. and stretching the heated porous film in at least one direction at a stretch ratio of about 1.5 to about 7.5 adhered to at least one layer of a material selected from the group consisting of a carded web, a polymeric foam product, a woven fabric, a spunbond fabric, a meltblown fabric and a self-bonded nonwoven web.

19. The porous film composite of claim 18 wherein said beta-spherulite nucleating agent comprises a red quinacridone dye.

20. The porous film composite of claim 19 wherein said red quinacridone dye has the structural formula:

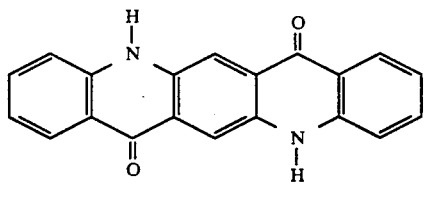

* * * * *